US006975847B1

(12) United States Patent
Bienek et al.

(10) Patent No.: US 6,975,847 B1
(45) Date of Patent: Dec. 13, 2005

(54) FILTERING OF A RECEIVE FREQUENCY BAND

(75) Inventors: Bernd Bienek, Bocholt (DE); Edgar Bolinth, Moenchengladbach (DE); Yusuf Kalayci, Duisburg (DE); Uwe Schwark, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,341

(22) PCT Filed: Sep. 16, 1999

(86) PCT No.: PCT/DE99/02960

§ 371 (c)(1),
(2), (4) Date: Mar. 29, 2001

(87) PCT Pub. No.: WO00/19624

PCT Pub. Date: Apr. 6, 2000

(30) Foreign Application Priority Data

Sep. 30, 1998 (DE) ................................ 198 45 054

(51) Int. Cl.[7] ................................................ H04B 1/10

(52) U.S. Cl. .................... 455/306; 455/307; 455/192.1

(58) Field of Search ............................ 455/131, 192.1, 455/192.3, 307, 23, 24, 323, 306, 190.1, 455/191.1, 191.3; 375/316, 334

(56) References Cited

U.S. PATENT DOCUMENTS

| | | | | |
|---|---|---|---|---|
| 5,604,746 A | | 2/1997 | Oto | |
| 5,619,536 A | | 4/1997 | Gourgue | |
| 5,748,623 A | * | 5/1998 | Sawahashi et al. | 370/342 |
| 5,894,499 A | * | 4/1999 | Katayama et al. | 375/334 |
| 6,043,721 A | * | 3/2000 | Nagode et al. | 332/117 |
| 6,115,593 A | * | 9/2000 | Alinikula et al. | 455/324 |
| 6,275,540 B1 | * | 8/2001 | Barrett et al. | 375/316 |

* cited by examiner

*Primary Examiner*—Sonny Trinh
*Assistant Examiner*—Sam Bhattacharya
(74) *Attorney, Agent, or Firm*—Fish & Richardson P.C.

(57) ABSTRACT

The invention relates to the filtering of a subfrequency band out of a receive frequency band, in which a carrier frequency for prefiltering the receive frequency band and an intermediate frequency for demodulating the frequency band filtered out during the prefiltering and for generating a frequency baseband are inserted into the signal propagation path, in which the desired subfrequency band is filtered out of the frequency baseband by a post-filtering and in which the carrier frequency, the intermediate frequency and the post-filtering are matched to one another.

12 Claims, 4 Drawing Sheets

FILTERING OF A RECEIVE FREQUENCY BAND

FIELD OF INVENTION

The invention relates to a method and a receiver for receiving transmitted signals which can be transmitted in various subfrequency bands of a receive frequency band.

BACKGROUND

It is of advantage, especially in radio systems for transmitting transmitted signals by radio but also in line-connected transmission systems, if the transmitted signals can be received in various subfrequency bands of a receive frequency band. Individual subfrequency bands differ from one another with regard to their bandwidth and/or with regard to their frequency in the receive frequency band. By changing from a first subfrequency band to a second subfrequency band which has a greater bandwidth, transmitted signals with a greater transmission rate can be transmitted, for example. In a boundary case, the subfrequency band used is equal to the receive frequency band, i.e. the maximum available frequency bandwidth is utilized by the subfrequency band.

It is known to filter out a signal frequency band containing the transmitted signals by tuning the receive frequency band to a carrier frequency and by filtering the receive frequency band in a receiver. The signal frequency band is then demodulated in a demodulator so that a frequency baseband containing the transmitted signals is available at the output of the demodulator. The frequency baseband is processed further, for example, in that the information contained in it is digitized by means of an analog/digital converter and conditioned for its intended use as transmitted signals by subsequent fine filtering and/or further processing steps.

Surface acoustic wave filters (SAW filters) are known as filters for filtering a signal frequency band out of the receive frequency band as subfrequency band. However, SAW filters have the disadvantage of being relatively expensive to manufacture or procure.

To filter out subfrequency bands of different bandwidths in a radio-frequency section of a receiver, a plurality of SAW filters and/or SAW filters with different filter bandwidths are used. Each SAW filter or each filter bandwidth, respectively, corresponds to a bandwidth of one of the subfrequency bands which can be filtered out in the receiver. Because of the plurality of SAW filters or the plurality of filter bandwidths, such a receiver is relatively expensive. Furthermore, additional, relatively expensive switching elements, for example PIN diodes, are needed for switching to a different SAW filter or to a different filter bandwidth, respectively, when the subfrequency band is changed.

From U.S. Pat. No. 5,604,746, a method and receiver for receiving transmitted signals which can be transmitted in various subfrequency bands of a receive frequency band is known in which a first signal frequency band containing the transmitted signals is filtered out by adding a carrier frequency to the receive frequency band and by prefiltering the receive frequency band, in which a frequency baseband containing the transmitted signals is generated by demodulating the first signal frequency band by adding an intermediate frequency to the first signal frequency band, and in which at least one second signal frequency band containing the transmitted signals is filtered out of the frequency baseband by post-filtering, the carrier frequency and/or the intermediate frequency being matched to one or more filter parameters in the post-filtering in such a manner that the desired subfrequency band is available as a second frequency band.

It is the object of the present invention to specify a method and a receiver for receiving transmitted signals which can be transmitted in various subfrequency bands of a receive frequency band, the application or use of which requires little hardware costs.

SUMMARY

In the method according to the invention, a first signal frequency band containing the transmitted signals is filtered out by adding a carrier frequency to a receive frequency band and by prefiltering of the receive frequency band. A frequency baseband, the bandwidth of which preferably essentially corresponds to the bandwidth of the first signal frequency band and which contains the transmitted signals is generated by adding an intermediate frequency to the first signal frequency band and by demodulating the first signal frequency band. A second signal frequency band containing the transmitted signals is then filtered out of the baseband by post-filtering. The carrier frequency and/or the intermediate frequency are matched to one or more filter parameters during the post-filtering in such a manner that the desired subfrequency band is available as second signal frequency band. After that, the information contained in the first signal frequency band is digitized. In particular, the demodulation and the post-filtering is then performed as fine filtering on the digitized information. In this process, the post-filtering is matched to the carrier frequency and/or the intermediate frequency. At the device end, a digital filter is thus provided in order to filter the transmitted signals out of the digitized information. The digital filter can be driven by the common frequency and post-filter control of the pre-filter and post-filter.

According to a core concept of the invention, the desired subfrequency band is filtered out by combined pre- and post-filtering with matched filter frequencies or filter parameters during the prefiltering and post-filtering. An essential advantage of this concept is that during the prefiltering, a filter having a fixed invariable filter bandwidth can be used. This makes it possible to save costs which, on the other hand, do not occur in the same magnitude during post-filtering since the filtering of the desired subfrequency band out of the baseband can be implemented much less expensively.

The receiver according to the invention has a first oscillator for coupling a carrier frequency into a receiving path of the receive frequency band. In the receiving path, a prefilter is arranged for filtering a first signal frequency band containing the transmitted signals out of the receive frequency band matchd to the carrier frequency. Furthermore, a second oscillator is provided for coupling an intermediate frequency into a first signal path of the first signal frequency band. In the first signal path, a demodulator is arranged for demodulating the first signal frequency bandwith the inserted intermediate frequency and generating a frequency baseband, the bandwidth of which essentially corresponds to the bandwidth of the first signal frequency band and which contains the transmitted signals. In a base path of the frequency baseband, a post-filter is arranged for filtering a second signal frequency band containing the transmitted signals out of the frequency baseband. A common frequency and post-filter control of the post-filter and of the first oscillator and/or the second oscillator is provided for tuning the carrier frequency and/or the intermediate frequency with one or more filter parameters of the post-filter in such a manner that the desired subfrequency band is available as the second signal frequency band. A common frequency and post-filter control is not only a central control but also a distributed control, a control unit of the post-filter supplying, for example, information to a control unit of the first and/or second oscillator and/or conversely. Furthermore, the information contained in the first signal frequency band is digitized. In particular, the demodulation and post-filtering is then performed as fine filtering on the digitized information. In this process, the post-filtering is matched to the carrier frequency and/or the intermediate frequency. At the device end, a digital filter is thus provided in order to filter the transmitted signals out of the digitized information. The digital filter can be driven by the common frequency and post-filter control of the pre-filter and post-filter.

The post-filter preferably exhibits a low-pass filter or a high-pass filter or a high-pass/low-pass filter combination, the cut-off frequency of which or cut-off frequencies of which of which are matched to the carrier frequency and/or the intermediate frequency in such a manner that the cut-off frequency or cut-off frequencies separate the desired subfrequency band from all neighboring frequency bands which may still be present in the frequency baseband. Low-pass filters and/or high-pass filters for filtering the frequency baseband can be inexpensively implemented, for example by means of cascaded RC sections which are components of a single integrated circuit. However, other solutions known per se can also be selected, for example operational amplifiers which have feedback with RC sections.

In particular, the intermediate frequency which determines the zero frequency value of the frequency baseband is selected in such a manner that the zero frequency value is in the center of the desired subfrequency band.

When the method according to the invention is carried out, only a single subfrequency band, namely the desired subfrequency band, is filtered out in many cases. In a variant, however, a plurality of desired subfrequency bands is filtered out.

In particular, a high-pass filter or a low-pass/high-pass filter combination is used in the post-filtering in such a manner for filtering out the single desired subfrequency band or one of the desired subfrequency bands which is not symmetric to the zero frequency of the frequency baseband. If correspondingly, both a low-pass filter and a high-pass filter and/or a high-pass/low-pass filter combination is used during the post-filtering, both a desired subfrequency band is filtered out which is symmetric to the zero frequency value and one or more subfrequency bands which are not symmetric to the zero frequency value of the frequency baseband are filtered out.

If the desired subfrequency band or one of the desired subfrequency bands is filtered out by high-pass filtering of the frequency baseband or a combination of high-pass and low-pass filtering of the frequency baseband, the desired subfrequency band being either in the positive or in the negative frequency range of the frequency baseband, the subfrequency band filtered out is preferably digitized after the filtering-out and transposed by the digital conversion into a frequency range which contains the zero frequency value. In particular, the desired subfrequency band thus obtained is then symmetric to the zero frequency value.

In a preferred further development, the carrier frequency for the prefiltering is set in such a manner that one or more neighboring frequency bands of the desired subfrequency band are already split off during the prefiltering. In particular, the combination of the preset filter frequency bandwidth used during the prefiltering and the arbitrarily adjustable carrier frequency which is coupled into the receiving path acts like a freely adjustable band-pass filter. In this manner, either all neighboring frequency bands above or all neighboring frequency bands below the desired subfrequency band can already be split off by the prefiltering. This is of advantage, in particular, when neighboring frequency bands having a greater receive field strength than the desired subfrequency band are received. However, adjusting the limits of the prefilter frequency range, i.e. adjusting the band-pass cut-off frequencies, is preferably also matched to the choice of intermediate frequency and the choice of the filter parameter or parameters of the post-filter.

It is known per se to provide on the signal path between the prefilter and the demodulator an amplifier arrangement which optimally matches the level of the frequency band filtered out during the prefiltering to the demodulator. If then there is in the first signal frequency band a plurality of subfrequency bands, one of which is the desired subfrequency band, and if the desired subfrequency band has a lower field strength or a lower level than one or more of the neighboring frequency bands, it is advantageous if the second signal frequency band is amplified after the post-filtering has been performed at least partially. In this manner, the level of the desired subfrequency band which is low due to the matching to the demodulator is raised, preferably to a level value which is matched to any subsequent processing stages. At the device end, a second signal band amplifier for amplifying the second signal frequency band is therefore arranged in a second signal path of the second signal frequency band following the post-filter or, respectively, following the first part of the post filter in the direction of signal propagation in a further development.

In a further development, the second signal path exhibits a bypass for unamplified forwarding of the second signal frequency band, which is connected in parallel with the second signal band amplifier.

The second signal band amplifier is composed of a plurality of individual amplifiers, in particular, for example of two individual amplifiers having a low-noise input amplifier stage.

An embodiment of the receiver according to the invention is especially preferred in which the second signal band amplifier which may be present and at least a part of the post-filter are arranged in a common integrated circuit.

It is also especially preferred if the demodulator and at least part of the post-filter are arranged in a common integrated circuit. The correspondingly high degree of integration saves production costs and space.

At the device end, the analog/digital converter is then arranged behind the prefilter and in front of the digital demodulator in the direction of signal propagation.

A digital demodulator, especially a digital I/Q demodulator, performs a digital down-conversion of the first signal frequency band, for example from frequency ranges around 10 MHz into the frequency baseband.

The method according to the invention is not restricted to receive frequency bands, the subfrequency bands of which are in non-overlapping frequency ranges. Instead, the method can also be used in the case of subfrequency bands which overlap one another. For example, subfrequency bands according to the OFDM (Orthogonal Frequency Division Multiplex) modulation method overlap. However, the field strength of the next subfrequency band adjoining a certain subfrequency band is approximately zero at the frequency value at which the certain subfrequency band has its maximum field strength. In this sense, the individual subfrequency bands are orthogonal subfrequency bands. When the receive frequency band is sampled, the certain subfrequency band can then be sampled in the area of its peak so that, at the most only small signal components and in the ideal case no signal components of adjacent subfrequency bands are also detected. Since there are no distinct frequency boundaries of the individual subfrequency bands in the case of subfrequency bands which overlap, the cut-off frequencies of the subfrequency bands are replaced by meaningful separating frequencies at which separation takes place between a filtered-out frequency range and frequency ranges which are cut off during the filtering of the receive frequency band and the further frequency bands filtered out of the receive frequency band. Separating frequencies must be selected in such a manner that the frequency ranges filtered out contain the desired subfrequency bands and the desired subfrequency band in useable form, i.e. the information contained therein can be used and the signal components of the frequency ranges cut off do not impede the evaluation and/or render it impossible.

The present invention will now be explained in greater detail with reference to exemplary embodiments. However, it is not restricted to these exemplary embodiments. In the description which follows, reference is made to the attached drawing in the individual figures of which:

DETAILED DESCRIPTION

Figure 1:
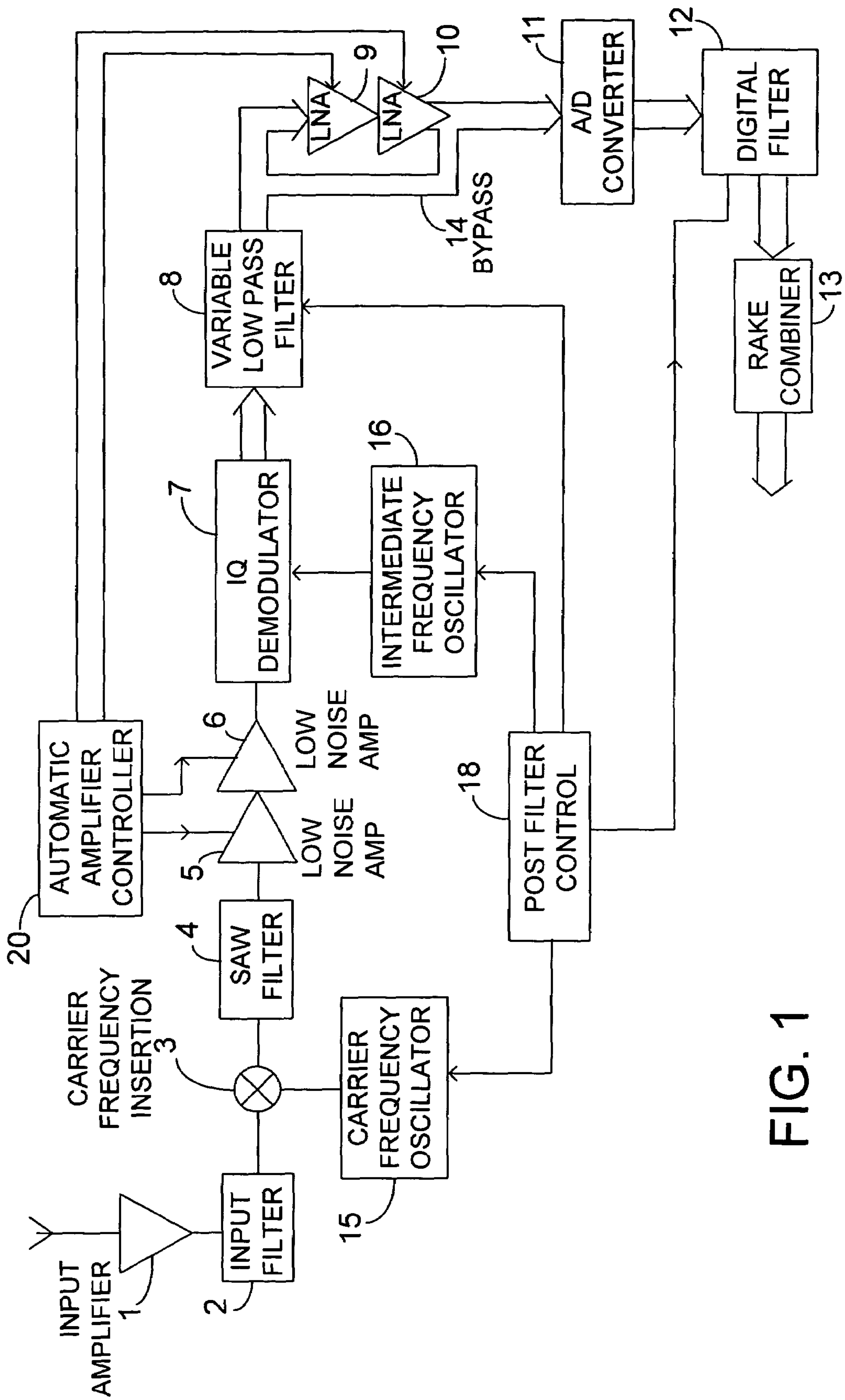
FIG. 1 shows an especially preferred embodiment of a receiver according to the invention.

FIG. 1 shows a receiver according to the invention for receiving radio signals which are transmitted in a future radio system, the UMTS (Universal Mobile Telecommunication System). For certain operating modes, for example the uncoordinated operation of a multiplicity of mobile telephones, frequency bands of limited bandwidths are available. In the example shown, the receive frequency band has a frequency bandwidth of 4.096 MHz. The carrier frequencies for the radio transmission of the transmitted signals are in the range of 2 GHz.

The receiver shown in FIG. 1 has at its input first an input amplifier 1 and an input filter 2 in the direction of signal propagation as is known from the prior art. The input filter 2 is used for coarse filtering out of the frequency range used in the UMTS. In the direction of signal propagation, the input filter 2 is followed by carrier frequency insertion 3 at which the respective carrier frequency generated by a carrier frequency oscillator 15 is inserted into the signal propagation path.

In the direction of signal propagation, the carrier frequency insertion 3 is first followed by a surface acoustic wave (SAW) filter 4, two series-connected LNAs (Low Noise Amplifiers) 5, 6 and an I/Q (in-phase/quadrature) demodulator 7. The I/Q demodulator 7 is provided with an intermediate frequency which specifies the zero frequency value of the frequency baseband which is generated by the I/Q demodulator 7 by demodulating a frequency band present at its input by an intermediate-frequency oscillator 16.

At the output end of the I/Q demodulators 7, a section of the signal propagation path follows in which first a variable low-pass filter 8 is arranged. This is followed by a series circuit of two further LNAs 9, 10, a bypass 14 which allows output signals of the low-pass filter 8 to be forwarded unamplified to the analog/digital (A/D) converter 11 following it in the direction of signal propagation being connected in parallel to the LNAs 9, 10. The A/D converter 11 is followed by a digital filter 12 and then by a Rake combiner 13 for combining individual components of the receive signal which have been received by the receiver with time offset, for example due to multi-path propagation.

The LNAs 5, 6 and the LNAs 9, 10 are driven by an automatic amplifier control 20. The amplifier control 20 firstly drives the LNAs 5, 6 in such a manner that the output level of the LNA 6 is optimally matched to the I/Q demodulator 7. As a result, a sufficiently high output level is achieved at the output end of the I/Q demodulator 7 and, on the other hand, overdriving of the I/Q demodulator 7 is prevented. Furthermore, the LNAs 9, 10 are driven by the automatic amplifier control 20 in such a manner that the optimum input level is present at the A/D converter 11. If the output level of the low-pass filter 8 is sufficiently high, the signal is forwarded directly to the A/D converter 11 via the bypass 14 without amplification. For this purpose, switching means, not shown in greater detail, are provided which are also driven by the automatic amplifier control 20.

A combined frequency and post-filter control drives the carrier frequency oscillator 15, the intermediate-frequency oscillator 16, the low-pass filter 8 and the digital filter 12, in such a manner that transmitted signals of a desired subfrequency band are present at the output of the digital filter 12. For this purpose, a device, not shown, of the frequency and post-filter control 18 provides both the frequency and the bandwidths of the desired subfrequency band. The signal processing controlled by the frequency and post-filter control 18 will be discussed in greater detail below with reference to an exemplary embodiment.

The low-pass filter 8 consists of cascaded RC sections which are arranged in a common integrated circuit with the I/Q demodulator 7, the LNAs 9, 10 and the bypass 14 on one chip. The entire integrated circuit can thus be produced inexpensively in large numbers with little additional cost for the RC sections. The entire filter combination consisting of the SAW filter 4, the low-pass filter 8 and the digital filter 12 can thus be produced less expensively than in the prior art.

The receiver shown in FIG. 1 can be used for filtering out subfrequency bands having channel bandwidths of 0.256 MHZ, 0.512 MHz, 1.024 MHz, 2.048 MHz and 4.096 MHz, a subfrequency band having a bandwidth of 4.096 MHz corresponding to the entire receive frequency band. Since the bandwidth of all possible subfrequency bands can be achieved by dividing by means of one integral number on the receive frequency bandwidth, the hardware complexity in the digital area of the receiver can be kept down. In particular, the operating mode of the digital area can be simply adapted to a lower subfrequency bandwidth by reducing the clock rate to the corresponding fraction.

Figure 2:
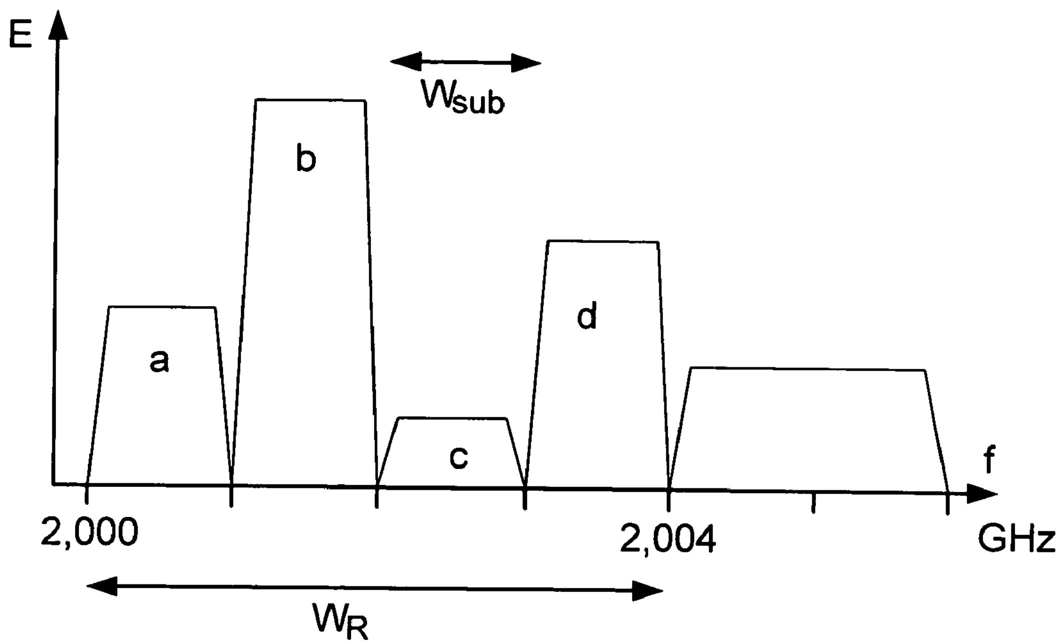
FIG. 2 shows the receive field strengths of adjacent subfrequency bands of a receive frequency band.
Figure 3:
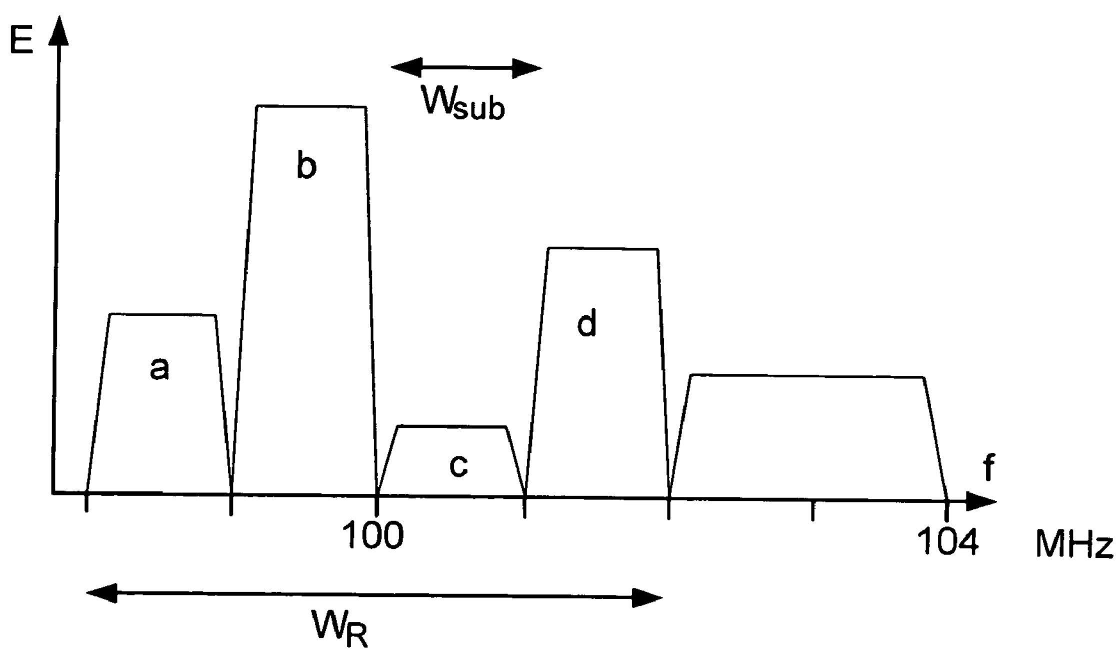
FIG. 3 shows the receive frequency band of FIG. 2 after a carrier frequency has been added or inserted, respectively.

Referring to FIG. 2 to FIG. 6, the filtering-out of a subfrequency band in the receiver shown in FIG. 1 is now explained by way of example. FIG. 2 shows a receive frequency band of frequency bandwidth $W_R$ with a total of four subfrequency bands in each case of frequency bandwidth $W_{Sub}$, and other frequency bands in which no transmission of transmitted signals is to be expected even if the radio channel is changed. The subfrequency bands are designated by letters a to d. In the exemplary embodiment, subfrequency band c is to be filtered out. Subfrequency band c corresponds to a transmission channel via which, for example, voice data are transmitted from a base station to a mobile telephone. The diagram according to FIG. 2 represents a snapshot. The frequency and the frequency bandwidth $W_{sub}$ of the desired subfrequency band can change by a change in the operating situation in the entire transmission system or in part-areas of the transmission system, the UMTS in the example. In particular, subfrequency bands with different frequency bandwidths $W_{sub}$ can also be present at another point in time within the limits of the subfrequency bands a to d in the receive frequency band.

For the sake of simplicity, the text which follows is based on the assumption that the frequency bandwidth $W_R$ of the receive frequency band is 4 MHz, that the frequency bandwidths $W_{sub}$ of the individual subfrequency bands are in each case 1 MHz and that the receive frequency band is transmitted to a receiver by means of a carrier frequency of 1.900 GHz. During the transmission to the receiver, the receive frequency band extends within the frequency range of 2.000 GHz to 2.004 GHz. The desired subfrequency band is within the frequency range of 2.002 GHz to 2.003 GHz.

The field strengths of the individual subfrequency bands a to d are shown in FIG. 2. The diagram shows the unfavorable situation, from the point of view of processing, that the field strength of the desired subfrequency band c is less than the field strengths of the two closest adjacent subfrequency bands b, d. During the processing of the receive signal, the carrier frequency is inserted into the signal propagation path at the carrier frequency insertion point 3. It is normally attempted to insert precisely the carrier frequency known to the receiver as the carrier frequency which was used in transmitting the receive signal. In the present case, however, a receive carrier frequency is inserted which is dematchd with respect to the transmit carrier frequency of 1.900 GHz. For this purpose, the frequency and post-filter control 18 drives the carrier frequency oscillator 15 in such a manner that it generates a receive carrier frequency of 1.902 GHz. This receive carrier frequency is inserted at the carrier frequency insertion point 3.

Due to the insertion of the receive carrier frequency and subtraction, a receive frequency band with reduced frequency is formed in which the desired subfrequency band c is within the frequency range of 100 MHz to 101 MHz.

Figure 4:
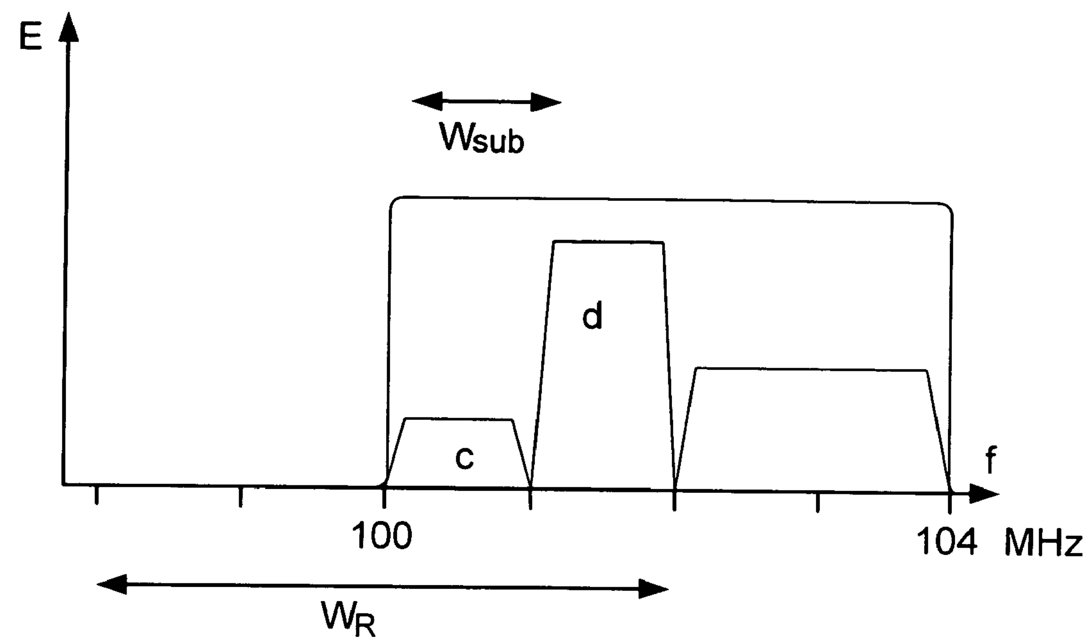
FIG. 4 shows the first signal frequency band filtered out of the receive frequency band of FIG. 3.

The SAW filter 4 is set unalterably to a frequency bandwidth which corresponds to the frequency bandwidth of the receive frequency band. In the example, this is a frequency bandwidth of 4 MHz. The SAW filter 4 filters a frequency band out of the frequency band present at its input, the lower boundary value of which is equal to 100 MHz. In the present example, the SAW filter 4 thus filters out a first signal frequency band which is within the frequency range of between 100 MHz and 104 MHz. The subfrequency bands a, b are thus already no longer present in the first signal frequency band (FIG. 4). The figure also shows the envelope curve of the SAW filter 4.

The receive carrier frequency was selected in such a manner that the immediately adjacent subfrequency band b with the greater field strength was split off from the desired subfrequency band c. If the field strength of the subfrequency band d had been greater than the field strength of the subfrequency band b, the receive carrier frequency would have been set to the value of 1.899 GHz so that subfrequency band b would have been split off.

The first signal frequency band is amplified by the automatic amplifier control in such a manner that the field strength of subfrequency band d corresponds to the optimum level of the I/Q demodulator 7 at the input of the I/Q demodulator. To demodulate the receive signal or the first signal frequency band, respectively, the frequency and post-filter control 18 drives the intermediate frequency oscillator 16 in such a manner that an intermediate frequency of 100.5 MHz is provided to the I/Q demodulator 7. In general, the intermediate frequency must be selected in the exemplary embodiment in such a manner that the frequency value in the center of the desired subfrequency band is equal to the intermediate frequency. This is because, during the demodulation, a frequency baseband is generated which extends around the zero frequency value and the frequency bandwidth of which is equal to the frequency bandwidth of the first signal frequency band due to the prefiltering.

Figure 5:
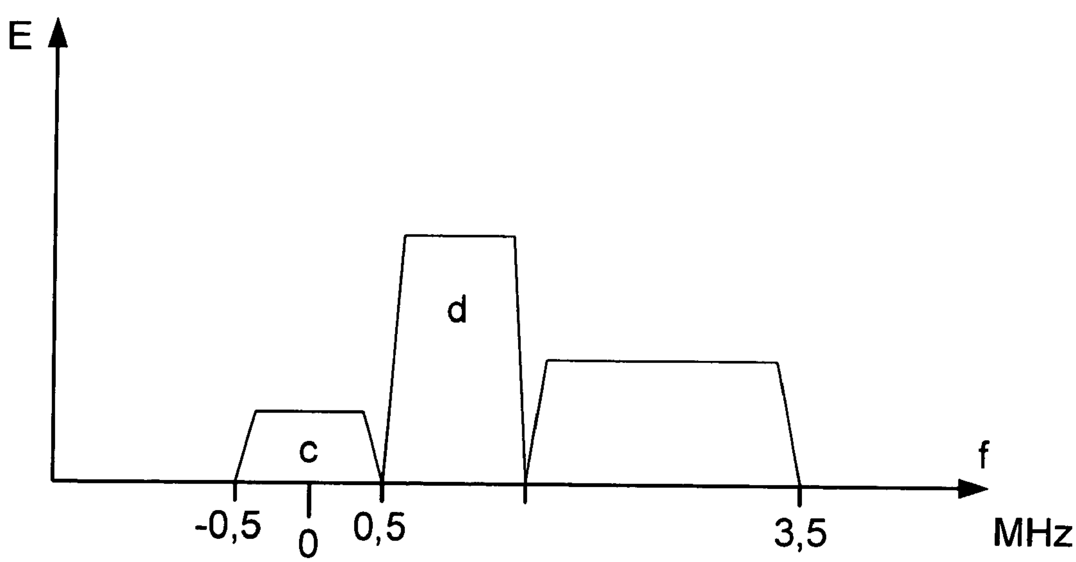
FIG. 5 shows the frequency baseband generated from the first signal frequency band of FIG. 4.
Figure 6:
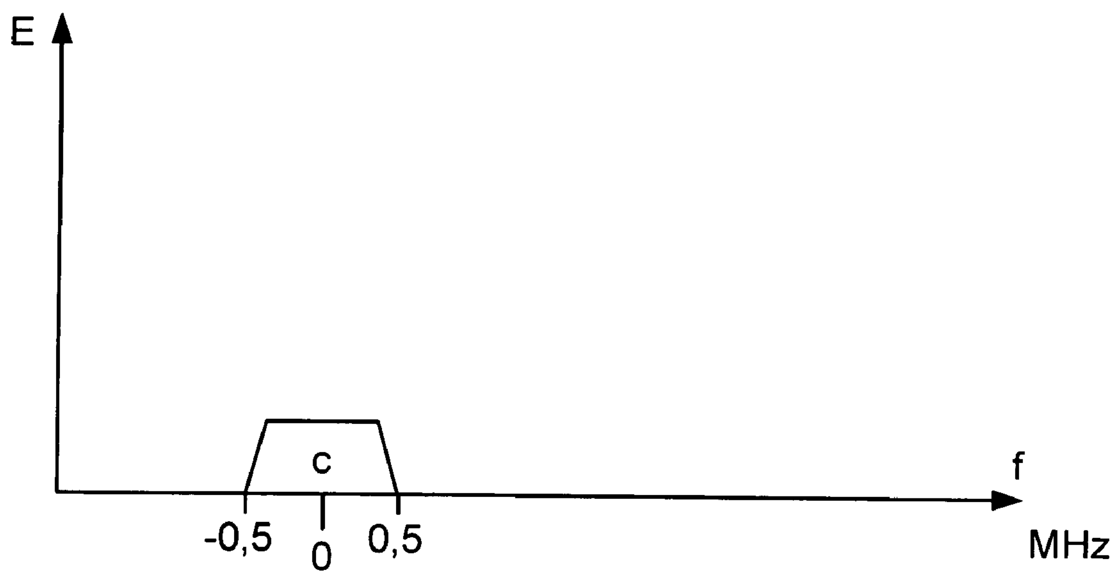
FIG. 6 shows the desired subfrequency band filtered out of the frequency baseband of FIG. 5.

In the present exemplary embodiment, a frequency baseband is generated in which subfrequency bands which are still present and adjacent frequency ranges having level values of greater than zero are within the frequency range of between −0.5 MHz and +3.5 MHz (see FIG. 5). The boundary position of the desired subfrequency band is then utilized in the next processing step. In this step, a frequency range, the value of which is below the cut-off frequency set in the low-pass filter 8, is filtered out of the frequency baseband in the low-pass filter 8. In the present case, the cut-off frequency of the low-pass filter 8 is set to a value of 0.5 MHz in that the frequency and post-filter control 18 appropriately drives the low-pass filter 8. As a result, only the desired subfrequency band c is present as rest of the frequency baseband at the output end (FIG. 6). The output signal is then supplied to the LNAs 9, 10 and its level is amplified to the optimum value for the A/D converter 11.

The digitized information obtained from the desired subfrequency band c is subjected to fine filtering in the w digital filter 12, corrections being performed on the digitized information in accordance with the bandwidth of the subfrequency band c in order to obtain the desired digital transmit signal. The common frequency and post-filter control 18 appropriately drives the digital filter 12 for this purpose. The digitized transmit signals are supplied to the Rake combiner 13.

In a further development of the receiver described in the exemplary embodiment, a band-pass filter or a high-pass filter is also used in addition to a low-pass filter in the post-filtering in order to filter out the subfrequency bands most closely adjacent to the desired subfrequency band or the subfrequency band most closely adjacent to the desired subfrequency band. From the signals or field strengths, respectively, of these subfrequency bands most closely adjacent or the subfrequency band most closely adjacent, a total power can be determined. The total power determined makes it possible to optimize the position of the prefilter implemented by the SAW filter 4 for the reception of the desired subfrequency band.

What is claimed is:

1. A method for receiving signals transmitted in frequency bands of a receive frequency band of a cellular mobile communication system, the method comprising:

obtaining a first signal frequency band containing the signals by adding a carrier frequency to the receive frequency band and by pre-filtering the receive frequency band;

generating a frequency baseband containing the signals by adding an intermediate frequency to the first signal frequency band and by demodulating the first signal frequency band;

performing post-filtering on the frequency baseband to obtain a second signal frequency band containing the signals, wherein post-filtering is performed by a post-filter having a cut-off frequency that is variable and that is matched to one or more of the carrier frequency and the intermediate frequency in order to separate the second signal frequency band from a neighboring frequency band;

digitizing information in the second frequency band to obtain digitized information;

fine-filtering the digitized information to obtain the signals in digital form; and amplifying signals of the second signal frequency band or bypassing amplifying the signals of the second signal frequency band based on a post-filter output level of the signals.

2. The method of claim 1, wherein the post-filter comprises one or more of a low-pass filter, a high-pass filter, and a high-pass/low-pass filter combination.

3. The method of claim 1, wherein amplifying comprises amplifying the second signal frequency band after post-filtering has been at least partially performed.

4. The method of claim 1, further comprising:

setting the carrier frequency to split off a neighboring frequency band of the second frequency band during prefiltering.

5. The method of claim 1, further comprising:

digitizing the first signal frequency band, wherein the frequency baseband is generated through digital demodulation.

6. The method of claim 1, further comprising:

performing one of a high-pass filtering and a combination of high-pass and low-pass filtering to filter out at least one subfrequency band in a range of the frequency baseband;

digitizing the at least one subfrequency band to produce a digitized subfrequency band; and converting the digitized subfrequency band into a frequency range which contains a zero frequency value.

7. A receiver for receiving signals transmitted in frequency bands of a receive frequency band of a cellular mobile communication system, comprising:

a first oscillator to insert a carrier frequency into a receive path of the receive frequency band;

a prefilter to filter a first frequency band containing the signals out of the receive frequency band with the carrier frequency;

a second oscillator to insert an intermediate frequency into a first signal path of the first frequency band;

a demodulator to demodulate the first frequency band with the intermediate frequency to generate a frequency baseband containing the signals;

a post-filter to obtain a second signal frequency band containing the signals from the frequency baseband, wherein the post-filter has a cut-off frequency that is variable, and wherein post-filter obtains the second signal frequency band by matching the cut-off frequency to one or more of the carrier frequency and the intermediate frequency in order to separate the second signal frequency band from a neighboring frequency band;

a second signal band amplifier to amplify a second frequency band; and a bypass connected in parallel with the second signal band amplifier for forwarding a non-amplified version of the second frequency band;

wherein the bypass is used based on a post-filter output level of the signals.

8. The receiver of claim 7, wherein the post-filter includes one of a low-pass filter, a high-pass filter and a high-pass/low-pass filter combination, the cut-off frequency separating the second frequency band from neighboring frequency bands.

9. The receiver of claim 7, wherein:

the demodulator and at least a part of the post-filter are arranged in a common integrated circuit.

10. The receiver of claim 7, further comprising:

an analog/digital converter.

11. The receiver of claim 7, wherein the post-filter includes:

a common frequency and post-filter control to match one of the carrier frequency and the intermediate frequency to the cut-off frequency;

an analog/digital converter to digitize information in the second frequency band; and a digital filter to filter the signals out of the digitized information.

12. The receiver of claim 11, wherein:

the second signal band amplifier and at least a part of the post-filter are arranged in a common integrated circuit.

* * * * *